(12) United States Patent
Hadi

(10) Patent No.: US 7,539,768 B2
(45) Date of Patent: May 26, 2009

(54) SYSTEM AND METHOD FOR DELIVERING LAST MILE COMPUTING OVER LIGHT FROM A PLURALITY OF NETWORK EDGE LOCATIONS

(76) Inventor: Altaf Hadi, 123 Glen Ridge Dr., Murphy, TX (US) 75094

( * ) Notice: Subject to any disclaimer, the term of this patent is extended or adjusted under 35 U.S.C. 154(b) by 0 days.

(21) Appl. No.: 11/763,703

(22) Filed: Jun. 15, 2007

(65) Prior Publication Data
US 2007/0239850 A1  Oct. 11, 2007

Related U.S. Application Data

(63) Continuation of application No. 10/353,268, filed on Jan. 28, 2003, now Pat. No. 7,233,999.

(51) Int. Cl.
G06F 15/16 (2006.01)
(52) U.S. Cl. .................... 709/231; 709/219; 709/232; 709/238; 379/93.31
(58) Field of Classification Search ............... 709/219, 709/231, 232, 238; 379/93.31
See application file for complete search history.

(56) References Cited

U.S. PATENT DOCUMENTS

| | | | |
|---|---|---|---|
| 5,809,145 A | 9/1998 | Silk et al. | |
| 6,052,380 A | 4/2000 | Bell | |
| 6,230,205 B1* | 5/2001 | Garrity et al. | 709/231 |
| 6,952,420 B1* | 10/2005 | Castellano | 370/395.6 |
| 2002/0128009 A1* | 9/2002 | Boch et al. | 455/426 |
| 2002/0181044 A1* | 12/2002 | Kuykendall | 359/124 |

* cited by examiner

Primary Examiner—Jinsong Hu

(57) ABSTRACT

In one embodiments, a system includes a processing platform that provides processing at multiple levels to multiple endpoints coupled to the processing platform via one or more intermediate networks. The system includes an optical transceiver coupled to the processing platform that receives from the processing platform multimedia content processed at the processing platform. The multimedia content delivers multiple services to the endpoints. The optical transceiver converts the multimedia content to light signals for communication to the endpoints via the intermediate network and communicates the converted multimedia content to the endpoints via the intermediate networks for display to subscribers at the endpoints.

29 Claims, 9 Drawing Sheets

SYSTEM AND METHOD FOR DELIVERING LAST MILE COMPUTING OVER LIGHT FROM A PLURALITY OF NETWORK EDGE LOCATIONS

RELATED APPLICATION

This application is a continuation, under 35 U.S.C. §120, of U.S. patent application Ser. No. 10/353,268, filed 28 Jan. 2003.

TECHNICAL FIELD OF THE INVENTION

This invention relates generally to communication systems and more particularly to delivering last mile computing over light from a plurality of network edge locations.

BACKGROUND OF THE INVENTION

Desktop based computing has emerged as the de facto mode of delivering computing replacing mainframe computing. Users have to purchase expensive personal computers and or laptop computers to meet their computing needs. With changes in the processor speed or with the availability of newer programs and operating systems, users are forced to replace their desktop based personal computers and laptop computers every few years. For corporations, management of desktop computers has become the second biggest expense after employee payroll. The purchase price of a desktop computer is only a fraction of the total cost of supporting desktop based systems over their short life span of 24 to 36 months. In addition to mounting costs, desktop based computing also creates huge loss of productivity. Every user of desktop computer is acutely aware of the painful downtime they have to endure when their system fails. Key applications such as database applications are delivered from centralized servers, which traditionally are powerful desktop computers. They typically have the same or a little longer life span than that of desktop computers. Maintenance and management costs of centralized servers can be an order of magnitude higher than desktop computers. A majority of server based applications have a client component, which once again needs to be run on a desktop computer. Those client-server applications that eliminated the client component, and can now be accessed over the Internet, still generally are accessed by using either a desktop based personal computer or a laptop computer.

For mobile users, laptop computers to a certain extent have eased the problem of accessing information when traveling. But not all people have laptops. Those users who have laptops, security of their information becomes a concern. Even the physical security of laptop computers is an issue. They can be easily lost, stolen or broken. But the biggest concern of laptop computer users is the speed by which they access server based applications and data, when away from their office locations. As user programs become more sophisticated and bulky, laptop users, when away from their offices are paralyzed by slow access speeds. Today attachments of over 1 megabyte are commonplace and are growing in size.

Computing to this day remains elusive from a vast number of people. Not everyone can afford a desktop system. Even the richest school districts cannot provide a computer to every student. In its present form, the usage of desktop computers may never reach the ubiquitous penetration of that of telephone service. One vastly overlooked aspect of desktop based computing is the wastage of resources. At all times, only a fraction of personal computer and laptop computer processor and other key resources are utilized. And when these systems are turned off, none of the capabilities are utilized. Such colossal waste of permanently dedicated resources to one individual serves no purpose. Recycling of used desktop and laptop computers is another big problem. Unwanted desktop and laptop computers have already become a major environmental threat.

Recent innovations in the optical segments of the telecommunication industry have gone untapped.

SUMMARY OF THE INVENTION

The present invention provides a system and method for delivering multimedia last mile computing from network edge locations over light, embodying a wide array of converged programming, processing, and networking logic. The network edges can embody a plurality of locations—a campus data center location, a metro data center location, a rural data center location, and a traditional telecommunication central office location, for example. The computed multimedia information can deliver a plurality of services—data services, voice services and video services, for example.

In one embodiment of the present invention, a last mile computing system includes a relatively tightly coupled optical unit and a macro processing system. The macro processing system delivers processing capacity to the last mile computing subscriber based on said subscriber's subscription level. The processing capacity can be of various strength levels. The optical unit includes an optical transceiver and can convert the computed multimedia information in light form and transmit it to be displayed on end devices connected to the client premise device. It can also receive subscriber commands and end device system messages in light form. The optical transceiver can multiplex multiple light signals of different colors that are each capable of supporting a plurality of distinct last mile computing session.

In another embodiment, a last mile computing system includes a multi user, multi tasking master operating system. The master operating system includes a kernel that can provide specialized functionality in addition to a general purpose operating system functionality. The specialized functionality can provide subscribers the freedom to choose and perform last mile computing from a plurality of commercial operating systems. The commercial operating system choices include, for example, Microsoft operating systems, Apple-Macintosh operating systems, Unix and Linux operating systems, and any other commercially available Legacy operating systems. Subscribers can also choose to perform last mile computing in a master operating system environment. The commercial operating systems can execute on top of the master operating system environment. The master operating system can mask its presence from the commercial operating systems while also masking the remoteness of subscribers. The commercial operating systems can operate such that they are operating in a standalone mode.

In another embodiment, a last mile computing system includes an allied resources subsystem that can provide critical system resources for the delivery of the multimedia last mile computing. These critical system resources include, for example, memory, storage, commercial operating systems and commercial applications and user programs.

In another embodiment, a last mile computing system includes an optically enabled communication network. The optical communication network can connect a centralized portion of the last mile computing system to a remote client premise device.

In another embodiment, a last mile computing system includes a client premise device. The client premise device has an optical transceiver and can interface to connect end devices to display, for example, data, voice, and video services. It can receive the computed multimedia information in light form and further cause it to be displayed on a corresponding end device. The optical transceiver unit can also convert and transmit subscriber commands and device system messages in light from a client premise device can support a plurality of last mile computing session.

Particular embodiments provide a means for the delivery of subscription based multimedia computing over light from network edge locations. The computed multimedia information can support the delivery of data service, voice service, and video service. Subscribers can access last mile computing services by providing authentication credentials to a last mile computing system. Voice services and video services can be delivered transparently, once subscribed.

Last mile computing systems in a defined geographical proximity can be members of a local last mile computing domain. Members of a local domain can be interconnected over a high capacity optically enabled communication network. Multiple local last mile computing domains in turn can be interconnected in an inter-domain architecture over such an optically enabled communication network. Subscribers of a particular local last mile computing domain can be considered foreign subscribers on a different last mile computing domain, and such a domain can be considered a foreign domain. Subscribers can select a home location to perform last mile computing during an initial subscription process.

Particular embodiments provide mobile subscribers freedom from having to carry any equipment. When away from home location, subscribers can perform last mile computing from any last mile computing system. Such a last mile computing system can be on subscribers' local domain or can be on any foreign domain. Regardless of which location subscribers choose to perform last mile computing, subscribers can have complete access to their applications and data. Similar to computing or data service, voice and video services can also be delivered transparently at any foreign last mile computing location of any foreign last mile computing domain. In essence, all last mile computing services—for example, data services, voice service, and video service—can follow the subscriber.

Particular embodiments, in which a last mile computing systems is interconnected in a local domain, can support over subscription, thereby enabling a last mile computing system to subscribe more subscribers than said system's total service capacity. Subscribers requesting service from a last mile computing system with no servicing capacity can be transparently handed over to a member last mile computing system on the local domain with adequate service capacity.

Certain embodiments may provide all, some, or none of these technical advantages, and certain embodiments may provide one or more other technical advantages which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

As used herein, the functional terminology of a parent kernel process and a child kernel process can be used interchangeably. The term "subscriber" encompasses an authorized user of the last mile computing system. The term "network edge" encompasses a centralized location from where computing can be performed and delivered. The term "home location" encompasses a subscriber's initial subscription location. The term "home domain" and "local domain" encompasses a group of interconnected last mile computing systems in a defined geography in which one of the last mile computing systems is a subscriber's home location last mile computing system. The term "foreign location" encompasses another last mile computing system that is not a member of the subscriber's home domain. The term "foreign domain" encompasses domain encompasses a group of foreign last mile systems interconnected in a defined geography. The terms "computing services" and "last mile services" can be used interchangeably and encompass data services, voice service, and video service. The term "data service" encompasses computing service.

Figure 1:
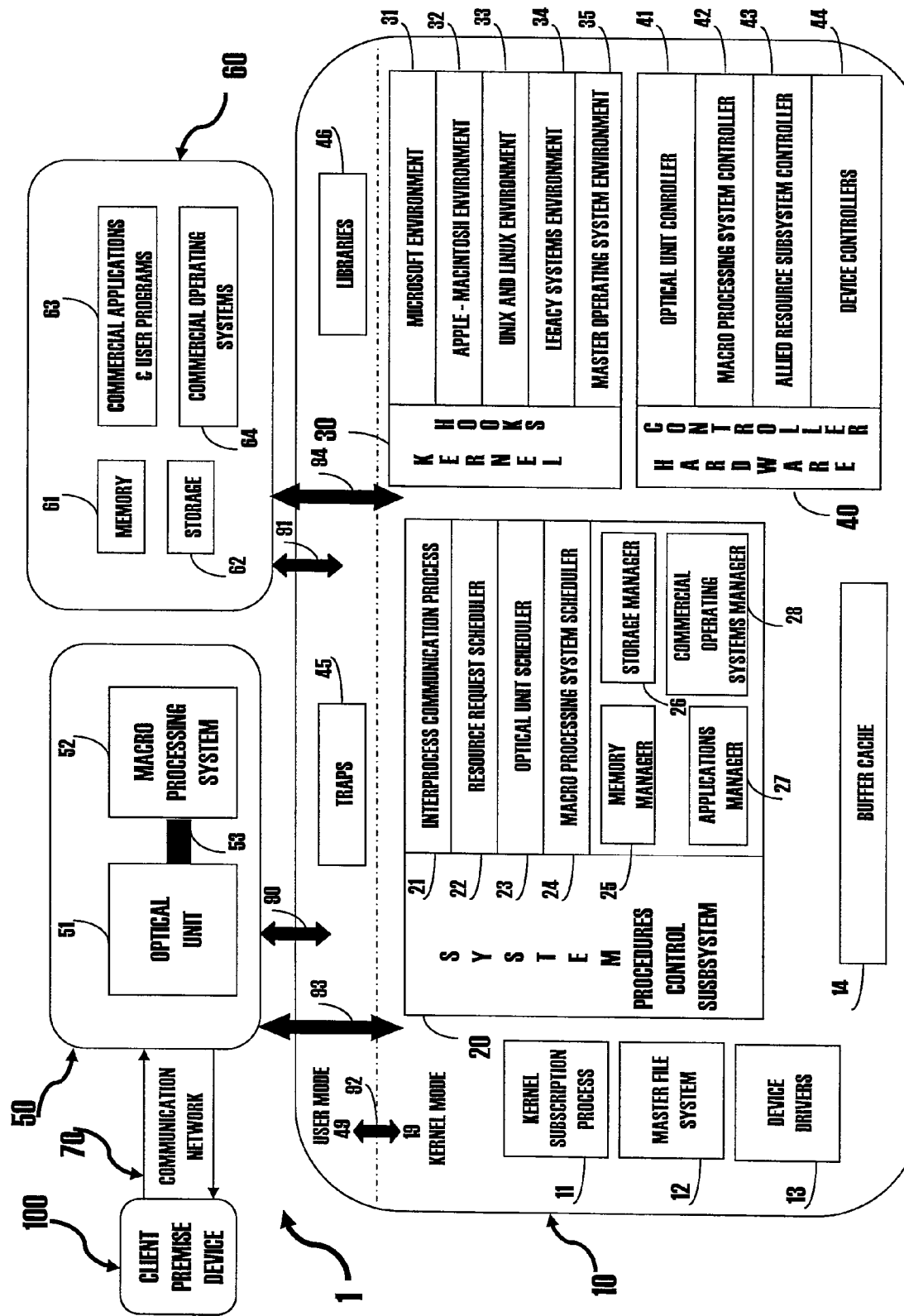
FIG. 1 illustrates an example last mile computing system.

FIG. 1 illustrates an example last mile computing system 1. The last mile computing system 1 delivers last mile multimedia computing over light from a network edge location. The last mile computing system 1 generally includes a master operating system 10, a tightly coupled networking-processing platform 50, an allied resources subsystem 60, a communication network 70, and a client premise device 100. The communication network 70 links the tightly coupled networking-processing platform to the client premise device 100 of the last mile computing system 1. The multimedia computed information transmitted by the tightly coupled networking-processing platform 50 using the communication network 70 to the client premise device 100 supports the delivery of data, voice, and video services. The master operating system 10, the tightly coupled networking-processing platform 50 and the allied resources subsystem 60 are collectively referred as the centralized assembly of a last mile computing system. The centralized assembly of the last mile computing system 1 can be at a plurality of network edge locations: a campus data center location; a metro data center location; a rural data center location; and a traditional telecommunication central office location. The client premise devices are located at a plurality of remote subscriber locations.

The tightly coupled networking-processing platform 50 is the heart of the last mile-multimedia computing system 1. It includes two distinct but highly coupled components, a large macro processing system 52 and a high capacity optical unit 51 having an optical transceiver. The macro processing system 52 delivers guaranteed processing capacity to subscribers whereby said capacity is reclaimed and added back to the pool of the available processing capacity at the end of each last mile computing session. During the initial startup or boot of the last mile computing system, a fixed measure of dedicated processing capacity is allocated to run the master operating system 10. This portion of the macro processing unit's 52 capacity is marked protected and remains dedicated to run the master operating system 10 and said capacity is excluded from subscriber use. The architecture of the macro processing system 52 is modular and the total processing capacity of said system can be varied. Such a modular architecture provides a means for offering various processing levels for subscribers to select from. Furthermore, subscribers can also request additional processing capacity by a click of a mouse should their processing requirements increase. The said modular architecture also provides a means for subscribers to reduce their subscribed processing capacity level. The total processing capacity of the macro processing system 52 is less than the subscribers' cumulative processing capacity requirements. The ratio of the processing capacity of the macro processing system 52 to the total subscribers' cumulative processing capacity requirement is variable. For example, a last mile computing system may be able to service 1000 subscribers at any given instance but the system may subscribe 1200 subscribers. This is due to the fact that all subscribed subscribers will not request service simultaneously. Based upon the system usage heuristics, and the density of subscribers, the system's service capacity to subscriber ratio can be lowered or increased.

The optical transceiver of the optical unit 51 of the tightly coupled networking-processing platform 50 transmits the computed multimedia information in light form using general purpose communication protocols over the communication network 70 to the client premise device 100. It also receives subscriber commands through end devices connected to the client premise device 100 and the system messages of these devices. The optical transceiver of the client premise device 100 converts the subscriber commands and devices system messages into light and transmits it over the communication network 70 to be received by said transceiver of the optical unit 51. The optical transceiver of the optical unit 51 thereby forwards said client premise location commands and system messages and passes them to the master operating system 10 for further processing.

The optical transceiver of the networking-processing platform 50 maintains a two way communication session with the client premise device 100. This enables the centralized assembly of the last mile computing system 1 maintain a highly responsive and seamless communication with the client premise device 100. The optical transceiver of said platform 50 multiplexes a plurality of light signals of different colors each color capable of supporting a plurality of distinct last mile computing session.

The two way communication between the optical transceiver 51 and the client premise device 100 can be dynamic. The optical transceiver of the optical unit 51 also provides a means for the last mile computing system 1 to communicate with other last mile computing systems and also the outside world. The optical unit 51 and the macro processing unit 52 of the networking-processing platform 50 are tightly coupled 53. These tightly coupled units of the networking-processing platform 50 can be present in a single chassis and can also be housed in separate chassis.

The master operating system 10 of the last mile computing system 1 is a multi user multi tasking operating system. It includes a kernel and provides general purpose operating system functionality of prior known art while also providing special purpose operating system functionality as described herein.

The master operating system 10 operates in two modes— the user mode 49, and the kernel mode 19. In the user mode 49, the master operating system 10 has common traps 45, and library routines 46 providing operating system functionality of prior known art. The master operating system 10 also provides system call interfaces 91 and 92 to facilitate the execution of processes in the user mode 49 originating from the client premise device 100 environment, the networking-processing platform 50 environment, and the allied resources subsystem 60 environment. System call interface 92 provides a means for processes to change state from user mode 49 to kernel mode 19. System call interfaces 90 and 91 facilitate communication between the kernel processes and the networking-processing platform 50 and the allied resources subsystem 60 environments respectively. Said interfaces also facilitates delivery of results of the processes executing in the kernel mode 19 to the networking-processing 50 and the allied resources subsystem 60 environments respectively Subscribers can choose to perform last mile computing in the master operating system 10 environment or they can choose any one of the commercially available operating systems 64 to perform last mile computing. When a commercial operating system is selected for performing last mile computing, an image of said operating systems gets loaded on top of the master operating 10 for execution. The master operating system 10 while masking its presence also masks the remoteness of the subscriber from the selected commercial operating system. Subsequently the master operating system 10 facilitates the proper functioning of the commercial operating system as described in subsequent sections.

During the initial boot of the last mile computing system 1, the master operating system 10 is loaded in memory space 61 of the allied resources subsystem 60. The off the shelf commercial operating systems 64 are run on top of the master operating system 10, should subscribers choose to perform last mile computing in a commercial operating system environment. The kernel processes of the master operating system 10 communicate with each other by making use of the services of the interprocess communication process 21 of the system procedures subsystem 20. As described heretofore, the kernel processes communicates with the networking-processing platform and the allied resources subsystem platform by making use of system call interfaces 90 and 91 respectively.

Some kernel process, such as the kernel subscription process 11, the memory manager process 25, and the storage manager process 26 spawn child processes, which are dedicated to facilitate the smooth operation of individual subscribers' last mile computing session. Said child processes constantly communicate the status of the subscriber's session to their parent processes and in case wherein any of the parameters of subscriber's last mile computing session falls below the optimal defined parameters, the parent processes issues executive level commands to the last mile computing 1 to immediately correct the situation and bring subscriber's last mile computing session to optimal levels of performance.

The allied resources subsystem 60 of the last mile computing system 1 includes memory space 61, storage space 62, commercial applications and user programs space 63 and commercial operating systems space 64. These are the required resources for delivering last mile computing as described herein. The architecture of the allied resources subsystem 60 can be expanded to include other general purpose devices such as video gateways, voice gateways, cache systems, and load balancing devices etc. The device drivers 13 module of the master operating system 10 may include the logic to facilitate the proper functioning of the newly introduced devices in the allied resources subsystem 60. Devices that master operating system 10 cannot service, the master operating system 10 provides means for introducing driver logic for servicing said devices.

Kernel processes of the master operating system 10 cater to large number of subscribers simultaneously while managing the overall system resources under their management. They do this by spawning identical child processes running in the kernel mode 19 for the administration, management and monitoring of each individual subscriber's last mile computing session. The parent process in turn manages all the child processes and also manages the overall system resources while the child process manages the resources under their jurisdiction. The child process continually presents the status of the resources under its jurisdiction to its parent process. Some child kernel processes such as the unique child kernel process once spawned remains alive during the entire subscription period of the subscriber regardless the subscriber is performing last mile computing or not. The child storage manager processes also remain alive during the entire subscription period. However, other child processes such as the child memory manager process, are spawned for the duration of the subscriber session and dies ones the session ends.

The kernel subscription process 11 of the master operating system 10 is the principal process to which all other kernel processes of the master operating system 10 reports their operational status. It monitors the overall performance of the last mile computing session to ensure that the service level agreements provided are continually met. Should the last mile computing session fall below optimal performance levels, the kernel subscription 11 process issues executive level commands to correct the situation immediately and brings the last mile computing session to optimal performance levels.

The kernel subscription process 11 has registries wherein said registries contain subscriber subscription and authentication information. When a new subscriber subscribes, the kernel subscription process 11 spawns a child kernel subscription process with a unique identifier, which identifies the child process as the child of the kernel subscription process 11. The child kernel subscription process contains a plurality of subscriber information including: subscriber system resources such as processing power level, memory space, and storage requirement information; subscriber location information; subscriber authentication information; types of last mile services subscribed; and the agreed upon system performance service level agreements, etc. The child kernel subscription process also contains intelligence to request the master operating system of a foreign domain to create a clone of it when subscriber intends to perform last mile computing from said foreign domain. It also has logic to switch from active to dormant state and from dormant to active state. The kernel subscription processes 11 furthermore encompasses service daemons on dedicated ports listening in slave mode to subscriber service requests. The service request can be of type computing or data service wherein the service daemon initiates the facilitation of subscriber authentication for the delivery of said service. Service requests can also be of type voice services and video services wherein the service daemon initiates the transparent delivery of said services request.

During subscriber last mile computing session, a plurality of kernel processes including: the master file system 12; memory manager 25, storage manager 26; applications manager 27; and commercial operating systems manager 28; etc, communicate the status of the resources under their jurisdiction to the child kernel subscription process 11 by using the services of interprocess communication process 21. The child kernel subscription process 11 thereby ensures that at all times the last mile computing system is delivering optimal performance meeting the subscriber subscribed service level criteria. If at any time, the last mile computing session performance tends to fall below optimal defined levels, the child kernel subscription process informs the parent kernel subscription process 11, to issue an executive command to correct the situation which the interprocess communication process 21 broadcasts to all those kernel processes who are responsible for and to take immediate corrective actions to bring the subscriber last mile computing session to optimal performance levels. The kernel subscriber process 11 administers, manages and monitors all the child kernel subscription process it spawns. The spawned child kernel subscription processes run in the kernel mode 49 in the protected memory of the memory space 61. The kernel subscription process 11 also provides a means for subscribers to modify registry entries relating to the subscription criteria. When subscribers intends to change subscription criteria, the last mile computing system challenges the subscriber for appropriate credentials, and when said credentials are provided and verified, subscribers are given access to a subset of subscription related kernel subscription process registry entries, thereby subscribers can change their subscription criteria.

At all times, the macro processing system scheduler 24 of the master operating system 10 keeps tracks of the available processing power of the macro processing system 52. When subscribers login to the last mile computing system 1 and requests service, the kernel subscription process 11 authenticates the subscriber and looks up kernel registries to determine subscriber subscription level. It then instructs the macro processing system scheduler 24 to secure and allocate appropriate processing resources to the subscriber session. During the duration of the subscriber's last mile computing session, the allocated processing capacity is guaranteed for said subscriber's use. Based on the heuristics of the subscriber's usage of the processing power, the master operating system 10 may use some of the subscriber allocated processing cycles for other purposes. However, the kernel subscription process 11 in charge of monitoring the service level agreements for the optimal performance of subscriber's session permits the usage of spare processing capacity only when the subscriber's processing requirements fall below predefined thresholds. The last mile system 1 can also be configured not to let the master operating system 10, use any of the subscriber allocated processing capacity for other purposes, for a select class of subscribers. Said select class of subscribers can be extended to include all subscribers of the last mile computing system 1.

The resource request scheduler 22 of the master operating system 10 enables kernel processes in requesting and securing system wide resources. When oversubscribed, the resource request scheduler 22 provides a means for the last mile computing system 1 to secure processing and other critical resources from peer last mile computing systems on a local domain. The kernel device drivers 13 module encompasses peripheral and other devices driver logic, the device controllers 44 of the hardware controller subsystem 40 provides means for controlling said devices. Device drivers 13 and device controllers 44 also provide means for accessing, administering and controlling the client premise device 100 location devices. The device drivers 13 module of the master operating system 10 include logic to facilitate the proper functioning of the commonly used devices that may get introduced in the overall system architecture, such as the introduction of new devices in the allied resources subsystem 60. Those devices without the driver and control logic embedded in the master operating system 10 environment, the master operating system 10 provides a means for introducing said devices, driver and control logic by making use of the kernel hooks of the master operating systems environment 35.

The master file system 12 of the master operating system 10 provides read write operation from and to the memory space 61 and storage space 62 of the allied resources subsystem 60. The master file system 12 can also perform read write operations from and to, peripheral storage devices connected to the client premise device 100. The kernel hooks 30 subsystem of the type of Microsoft Environment 31, Apple-Macintosh Environment 32, Unix and Linux Environment 33, and Legacy Systems Environment 34 provides a means for the master operating system 10 to invoke the file system functionality of said commercial operating systems to perform read write operations to the memory 61 and storage 62 of the allied resources subsystem 60 when a commercial operating system is selected by the subscriber to perform last mile computing. The kernel hooks 30 of the said types also masks the presence of the underlying master operating system from the commercial operating systems, whereby the presence of the master operating system is transparent to the commercial operating systems. Similarly, the master operating system 10 by making use of the kernel hooks 30 subsystem provides a means for programming in the commercial operating system environment. The kernel hooks of the type master operating system environment 35 provides a means for programming in the master operating system environment 10. The kernel hooks 30 of the appropriate type transparently passes through the subscriber commands and client premise device 100 system messages to the commercial operating systems. The appropriate kernel hooks also mask subscriber remoteness from said commercial operating systems. Quintessentially, the kernel hooks 30 subsystem simulates conditions conducive to the operation of commercial operating systems wherein said commercial operating systems operates as such they are in a standalone mode of execution.

During initial boot of the last mile computing system 1, the master operating system 10 is loaded in the memory 61 of the allied resources subsystem 60 and is run on pre-determined macro processing system space 52. This portion of the macro processing space 52 is exclusive for the operation of the master operating system 10. The system procedures control subsystem module 20 invokes the commercial operating systems manager 28 to determine the various types of commercial operating systems available in the commercial operating systems space 64. Subsequently the commercial operating systems manager 28 requests the hardware controller module 40 to invoke the allied resources subsystem controller 43 to load images of all the available commercial operating systems from the commercial operating systems space 64 in the memory 61 of the allied resources subsystem 60. The allied resources subsystem 60 keeps the loaded images of the commercial operating systems 64 in ready state at all times. When a subscriber requests service from the last mile computing system 1, the kernel subscription process 11 determines the operating system preference of the subscriber. If a commercial operating system selection is indicated, the kernel subscription process 11 issues a command to the system procedures control subsystem 20 to invoke the commercial operating systems manager 28 to oversee the configuration of the subscriber selected commercial operating system in the subscriber allocated resources. Then the hardware controller 40 is notified to invoke the allied resource subsystem controller 43 to configure the readily available image of the subscriber preferred commercial operating system such that the subscriber can begin performing last mile computing in the selected commercial operating system environment.

During subscriber login, based on subscriber subscription level and criteria, the macro processing system scheduler 24 allocates guaranteed processing capacity on the macro processing system 52 space, while the memory manager 25 allocates dedicated memory resources in the memory space 61 to the subscriber. If it is determined that the subscriber has chosen a commercial operating system to perform last mile computing, the commercial operating systems managers 28 by making use of the services of the allied resource subsystem controller 43, facilitates the configuration of the subscriber preferred operating system in subscriber allocated resources. The macro processing system controller 42 ensures that the subscriber selected operating system is run correctly in the macro processing system space 52 allocated for said subscriber. The commercial operating systems manager 28 then uses the appropriate kernel hooks subsystem 30 to monitor and manage the proper functioning of the subscriber selected commercial operating system.

When a newer version of commercial operating systems is available, copies of such versions are made available in the commercial operating systems space 64. The commercial operating systems manager 28 facilitates the notification of the availability of a newer version to the subscriber and should the subscriber choose to upgrade, the commercial operating systems manager 28 by making use the services of the allied resource subsystem controller 43 facilitates the transition to a newer version. The kernel subscription process 11 also updates its registry to the newer version of the operating system. Subscribers can also invoke their subscription registries and switch back to an older version of a commercial operating system or to a different commercial operating system environment for example from a Microsoft operating systems to a Apple-Macintosh operating system. The master operating system 10 also provide means for subscribers to switch back to the master operating system 10 environment to perform last mile computing. When subscribers switch from a commercial operating system based last mile computing to the master operating system based last mile computing, applications and data that was generated in a commercial operating system environment can continually be accessed by invoking the appropriate kernel hooks 30. During subscription process, subscribers can choose to perform last mile computing in the master operating system 10 environment.

During the initial subscription process, storage manager 26 of the master operating system 10 oversees the creation of dedicated storage in the storage space 62 of the allied resources subsystem 60. Unlike other resources such as memory and processing capacity that are allocated to subscribers for the duration of the last mile computing session, storage is permanently assigned for the exclusive of each individual subscriber of the last mile computing system 1. When a new subscriber applies for subscription, the storage manager receives input from the kernel subscription process 11 to spawn a permanent and unique child storage manager process to create subscriber exclusive storage in the storage space 62 of the allied resources subsystem 60. The unique storage child manager by makes use of the services of the allied resource subsystem controller 43, craft the most advantageous storage for said subscriber in the storage space 62. Subsequently the child storage manager safeguards the newly created subscriber storage space and provides a means for maintaining the integrity of subscriber content. Once spawned the unique child storage manager stays alive during the entire duration of subscriber subscription. It also keeps the kernel subscription process 11 informed about the subscriber storage status and content integrity. Subscribers can invoke their kernel subscription process registries to request additional storage space. Under such conditions the unique child of the storage manager 26 for said subscriber negotiates with the allied resource subsystem controller 43 to obtain the most suitable and contiguous storage for the subscriber in storage space 62. The storage manager 26 also enables subscribers to relinquish any excess storage.

The applications manager 27 of the master operating system 10 enables installation and removal of user programs and commercial applications in the master operating systems environment and in the selected commercial operating systems environment. Copies of the widely used commercial applications loaded after the initial system boot and are readily available for use by the subscribers. The application manager 27 also enables installation of user specific commercial applications and user programs in the permanent subscriber storage of storage 62 of the allied resources subsystem 60 by making use of the services of the master file system 12. Furthermore, the application manager provides a means for loading said subscriber specific applications and user programs in the subscriber allocated memory space for ready execution. The application manager 27 also enables subscribers to perform programming in the commercial applications environment by making use of the services of the appropriate kernel hooks subsystem 30. Subsequently the applications manager 27 provides means for monitoring and management of said commercial applications and user programs.

The memory manager 25 is responsible for the administration, monitoring and management of memory space 61 of the allied resources subsystem 60. During the initial system boot of the last mile computing system 1, the master operating system 10 gets loaded in a protected portion of the memory space 61. The memory manager 25 takes into account this portion of the memory space 61 where the master operating system 10 resides and marks the said memory area protected such that no other process or program can use said memory space. The memory manager 25 also protects the master operating system's 10 memory space by not allowing other processes and programs use said protected memory of memory space 61, even should such processes and programs attempt to use it. The memory manager 25 further marks additional memory from memory space 61 as reserved. Said reserved memory space is designated for the use of spawned kernel process and also to load the images of commercial operating systems and commercial applications to be readily available. Eternal processes such as child kernel subscription processes, child storage manager processes, etc. reside permanently in the reserved memory of memory space 61.

The memory manager 25 keeps tracks of the total memory space 61 and how much of is available at all times. During subscriber login, it receives instructions from the kernel subscription process 11, to allocate subscriber subscribed measure of memory for the subscriber's last mile computing session. The memory manager 26 then spawns a unique child memory manager process to service the kernel subscription process 11 command. The newly spawned child memory manager process by making use of the services of the allied resource subsystem controller 43 of the hardware controller subsystem 40, harvests the most suitable memory from memory space 61 in the subscriber subscribed measure and allocates it for subscriber use. And upon memory allocation in said measure, the kernel subscription process 11 checks it registry to determine if a commercial operating system is selected by the subscriber to perform last mile computing; and if so instructs the commercial operating systems manager 28 to load the readily available copy of the selected operating system into the memory and configure it for execution. The child memory manager process of the memory manager 25 then provides a plurality of memory management services including: caching; memory allocation; fragmentation and file mapping; paging; garbage collection; LIFO/FIFO; memory hierarchy and swapping; etc., during the duration of the subscriber's session for the continuous last mile computing session of said subscriber. The memory manager 25 then deducts the subscriber assigned memory from the total memory space 61. As the memory manager 25 continues to spawn child processes it assigns a unique identifier to identify each child process. The memory manager 25 then manages the child processes while managing the overall memory space 61 while the child memory manager processes manages the memory of memory space 61 under their respective jurisdictions. Based on the heuristics of the subscriber's usage of allocated memory, the master operating system 10 may use some of the subscriber allocated processing cycles for other purposes. However, the kernel subscription process 11 in charge of monitoring the service level agreements for the optimal performance of subscriber's session permits the usage of spare processing capacity only when the subscriber's memory usage requirements fall below predefined thresholds. The last mile system 1 can also be configured not to let the master operating system 10, use any of the subscriber allocated memory for other purposes, for a select class of subscribers. Said select class of subscribers can be extended to include all subscribers of the last mile computing system 1. At the end of the subscriber's last mile computing session, the child memory manager process, reclaims the memory that had been assigned to the subscriber and includes it back to the available pool of memory space 61. The child memory manager process then informs its parent, the memory manager 25, to issue a grateful death command and dies gracefully.

Subscriber's initial subscription location becomes their default home last mile computing location. The vast number of last mile computing systems connected via optically enabled communication networks offer subscribers the ability to perform last mile computing from any foreign domain when away from their home location. When subscribers requests service from a foreign last mile computing location, the kernel subscription process 11 of the home location gets notified of the subscriber's intent to perform last mile computing from a location. The kernel subscription process 11 of the home location negotiates the availability of system resources for the subscriber to perform last mile computing at the foreign location. Once the system resources are guaranteed, the kernel subscription process 11 informs the child kernel subscription process which has the subscriber information to create a clone of itself in the foreign last mile computing location of domain. The child kernel subscriber process requests the master operating system 10 of the foreign last mile computing system to create a clone of itself. The original child kernel subscription process at the subscriber's home location thereafter provides the subscriber's subscription information to the master operating system of the foreign last mile computing system in the foreign domain. The master operating system of the foreign last mile computing system thereby creates an exact replica of the child kernel subscription process in its kernel environment.

The cloned kernel subscription process thereafter takes over the administration, management and monitoring of the last mile computing session at the foreign last mile computing location. Subsequently said cloned process facilitates the transfer of subscriber applications and data content to the foreign location. At this time, the child kernel subscription process in the home domain goes into a dormant stage. The active cloned process in the foreign domain continually keeps the kernel subscription process 11 in the home domain updated about the performance of the last mile computing session at the foreign location. At the end of the subscriber session at the foreign last mile computing location, the cloned child kernel subscription process facilitates the synchronization of subscriber applications and data from the foreign location to the subscriber's default home location. Subsequently, the cloned kernel subscription process informs the original child kernel subscription process to come out of dormant mode into active mode. The cloned subscriber process then requests the master operating system 10 of the foreign location to issue a grateful death command and dies gracefully.

The optical unit scheduler 23 of the master operating system 10 keeps tracks of the total and available transceiver capacity of the optical unit 51. Working in tandem with the optical unit controller 41 of the hardware controller subsystem 40 it enables the optical unit 51 of the networking-processing platform 50 to communicate effectively and efficiently with a plurality of client premise devices 100. A plurality of master operating system 10 processes makes use of buffer cache 14 in ways similar to the usage of buffer cache of prior known art.

The total processing capacity of the macro processing system 52 is less than the cumulative processing requirements of the all subscribers for said last mile computing system 1. As described heretofore, this is a variable ratio based upon a plurality of criteria including: system capacity; geography; number of users; types of users; etc. When the last mile computing system 1 reaches it maximum processing capacity and when additional subscribers request service, the macro processing system scheduler 24 informs the resource request scheduler 22 that the home system has exhausted processing capacity and additional subscribers need to be serviced. The resource request scheduler 22 thereby confirms with other critical resource managers within its home environment to determine what additional resources needs to be secured from peer last mile computing systems on its local domain. Subsequently the resource request scheduler 22 broadcasts a resource required message on the local domain. It then collects and processes replies of all last mile computing systems, and subsequently secures resources on the least subscribed last mile computing system on the local domain. Next, the oversubscribed subscribers are transparently handed over to the selected peer last mile computing system for service.

Figure 2:
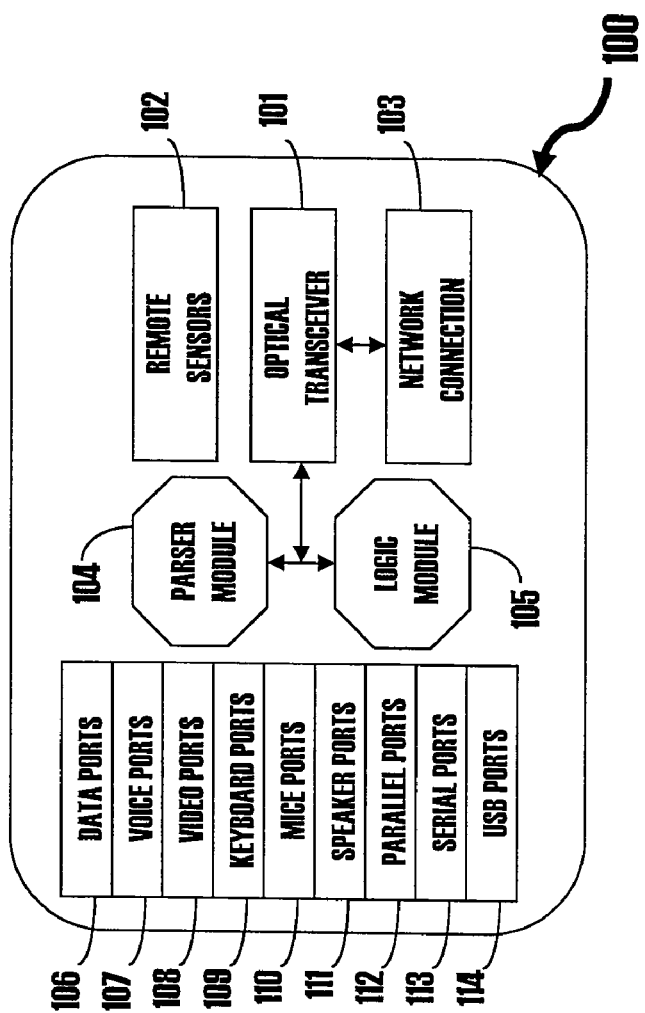
FIG. 2 illustrates an example client premise device.

FIG. 2 illustrates an example client premise device 100. It includes an optical transceiver 101 thereby providing means for converting the subscriber voice, video, and data commands, as well as the client premise device 100 system messages into light form, and using general purpose communication protocols transmits these messages over the communication network of FIG. 1. It also receives the incoming information on light from the optical transceiver of the networking-processing platform thereby converts this information into electronic form and hands it off to the parser module 104. The parser module 104 with the aid of the logic module 105 determines the appropriate output destination for the incoming information. For voice calls, the parser module 104 routes the information to the corresponding voice ports 107. Data or computing information is forwarded to data ports 106 to be displayed on corresponding data display devices such as monitors while video information is forwarded to video ports 108 to be displayed on video devices such as televisions. The logic module 105 also provides display devices window management. It may also collect and keep track of input device commands and messages. For voice calls, the logic module collects the sequentially dialed numbers on the voice device, determines when the number sequence is completed and thereafter forwards the collected digits to the optical transceiver 101 to complete the voice call. The logic module 105 communicates with the master operating system of FIG. 1 to process its information. The client premise device 100 also includes remote sensors 102, network connection 103, keyboard ports 109, mice ports 110, speaker ports 111, general purpose parallel ports 112, general purpose serial ports 113 and general purpose USB ports 114.

The remote sensor 102 transmits and receives information from a plurality of general purpose wireless input out device including: wireless phones; wireless keyboards; wireless mice; wireless speakers; wireless biometrics devices; etc. Network connection interface 103, connects the client premise device 100 to the communication network of FIG. 1, linking the client premise device to the centralized assembly of the last mile computing system. A plurality of video devices including: televisions; video cameras; etc. can be connected to video ports 108. A plurality of general purpose telephone devices including: PBXs; key system; telephone sets; etc. can be connected to the voice ports 107. Data or computing is displayed on, computing display devices connected to data ports 106. Keyboards, mice and speakers can be connected to ports 109, 110, and 111 respectively. Parallel port devices including printers can be connected to parallel ports 112. Serial devices and other general purpose devices with USB connection can be connected to ports 113 and 114 respectively. The client premise device 100 can support a plurality of last mile computing sessions.

Figure 3:
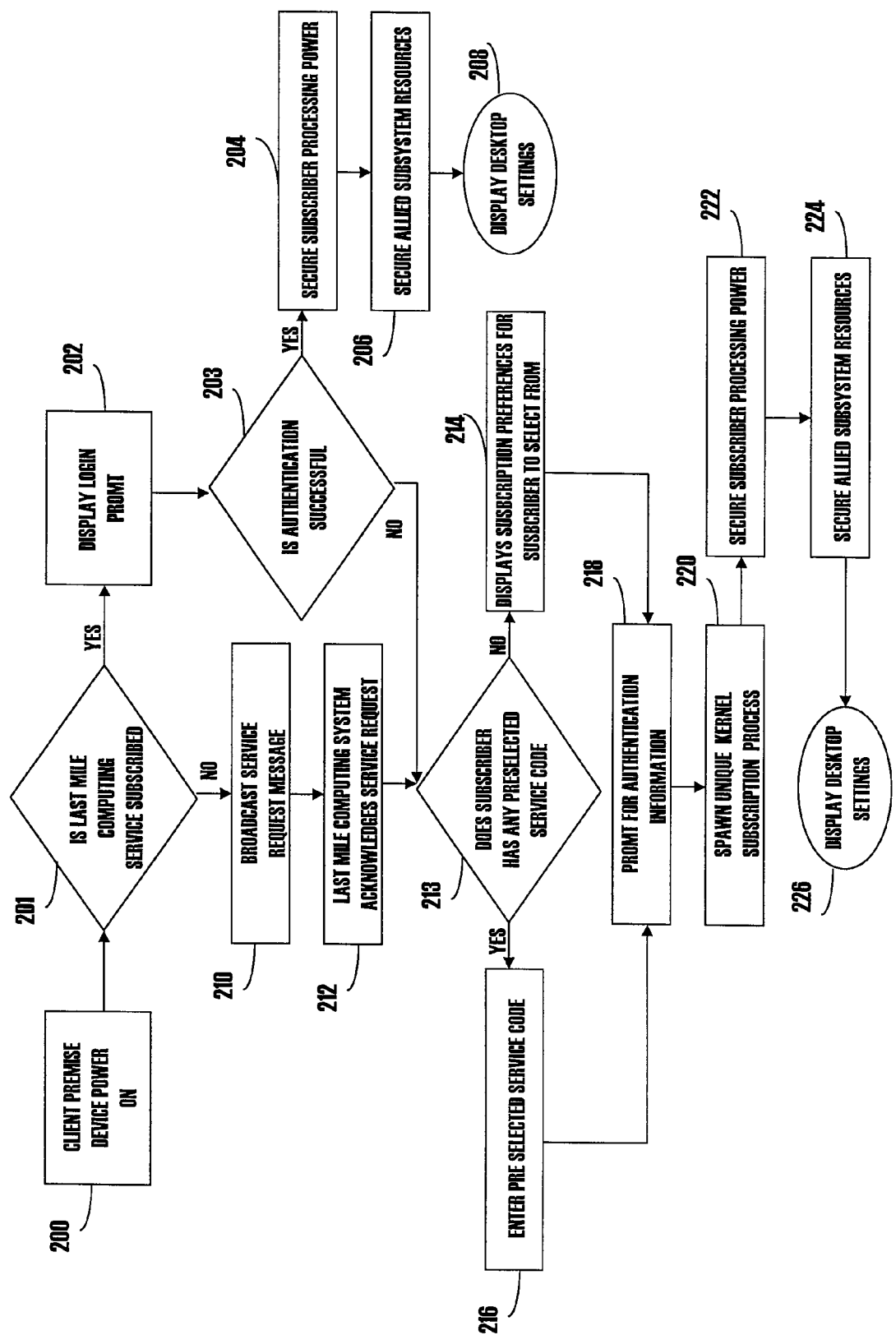
FIG. 3 illustrates an example initial subscription process and an example login process.

FIG. 3 illustrates an example initial subscription process and an example login process. At block 200 the logic embodies that a client premise device is powered ON and the logic moves to state 201, which has been illustrated as a decision diamond for clarity of disclosure. At state 201, the logic determines whether the last mile computing has been previously subscribed at the present location. This test is analogous to off hook position of the common plain old telephone service (POTS) phone to determine if there is dial tone. The manner in which the test at state 201 is conducted is that the client premise device sends a hello message on the network and if service at said location has been previously subscribed, the centralized assembly of the last mile computing system acknowledges the hello message thereby the logic at state 201 turns to positive and the logic moves to block 202. If no service has been subscribed at the present location, the centralized assembly of the last mile computing system does not acknowledge the hello message of the client premise device and the logic at state 201 turns negative and the logic moves to block 206.

At block 206, the logic is for the client premise device to broadcast a service required request message on the network. The service required message could be broadcasted to all local domain last mile computing systems. In a local domain one or more last mile computing systems can be present. The number of last mile computing systems in a local domain depends primarily on the subscriber density in a given geography. Though the service request message may be received by more than one last mile computing systems, the tightly coupled networking-processing platform of that last mile computing system responds in whose jurisdiction the client premise device location falls. As the logic moves to block 208, the networking-processing platform of the in-jurisdiction last mile computing system acknowledges the client premise device's request for service. This acknowledgement logic at block 208 is in the form of the servicing networking-processing platform presenting its unique system identification, which can be a combination of its ethernet address and other uniquely identifying system parameters. This unique identification pertains to the service providing last mile computing system in whose jurisdiction said client premise device location falls. At this juncture wherein the in-jurisdiction networking-processing platform indicates to the client premise device 100, that it is the service provider, the client premise device, populates its service provider identification field.

If the decision at state 201 is positive, the logic moves to block 202. The logic at block 202 is that the last mile computing system understands that the service has been previously subscribed at the present client premise device location. At this juncture, the master operating system instructs the kernel subscription process to issue a login prompt to the subscriber. As the logic at block 202 is executed, wherein a login prompt is displayed to the subscriber, the logic moves to the diamond decision box 203. If the decision at state 203 is positive, wherein the subscriber has provided the correct authentication credentials, the last mile computing system authenticates the subscriber and the logic moves to block 204 and then to block 206 wherein processing and allied subsystem resources are secured. The master operating system then configures the preferred operating system and loads any selected commercial application and user programs as described in FIG. 4. The logic then moves to the circular block 208, wherein the last mile computing system displays the desktop settings on the subscriber display, as described in subsequent sections, thereby subscriber can begin performing last mile computing.

A negative decision at state 203 may imply an additional subscriber wants to subscribe to the last mile computing system from said location. The logic then moves to state 213, which is the diamond decision box. State 213 is to determine whether the subscriber at the present client premise device location has a pre-selected subscription. The pre-selected subscription is primarily for corporate users whose corporation has signed a blanket last mile computing service for its employees. The manner in which the decision test at state 213 is conducted is that the networking-processing platform presents a window on the subscriber display device prompting the subscriber to input pre-selected service code. If the logic at decision diamond 213 is positive, the logic then moves to block 216. At block 216, the logic is to prompt the subscriber to enter the pre-selected service code The last mile computing service provider may offer a plurality of last mile computing services including: gold service package; silver service package; bronze service package; etc. These service packages may correspond to different processing power levels and different system resources such as memory and storage space etc. The logic at block 216 is for the subscriber to enter the required information. Once the last mile computing system verifies the pre-selected service code, the logic moves to block 218. If the diamond decision at state 213 is negative, the logic moves to block 214. At block 214, the logic is for the last mile computing system to present a series of subscription choices to the subscriber. Once the subscriber selects the desired subscription level and service types, the logic moves to block 218.

At block 218, the last mile computing system prompts the subscriber to enter authentication credentials. Once the subscriber provides authentication credentials, the logic moves to block 220. The logic at block 220 is that the kernel subscription process of the master operating system spawns a child kernel subscription process whose registries are populated with the subscriber's subscription information which includes subscribed service types, subscriber's processing power level, system resources requirement, preferred operating system, authentication information, and all other related information.

The logic then moves to block 222 and then to block 224 wherein processing and allied subsystem resources are secured. Since this is a new subscriber, at block 224 a unique child storage manager process is spawned which then harvests the most advantageous storage from storage space of the allied resource subsystem and allocates the harvested storage space permanently for subscriber's exclusive use. The master operating system then configures the preferred operating system and loads any selected commercial application and user programs as described in FIG. 4. Once the logic at block 224 is executed, the logic moves to circular block 226, which is to display the desktop settings on the subscriber's display device and subscriber can begin performing last mile computing.

Figure 4:
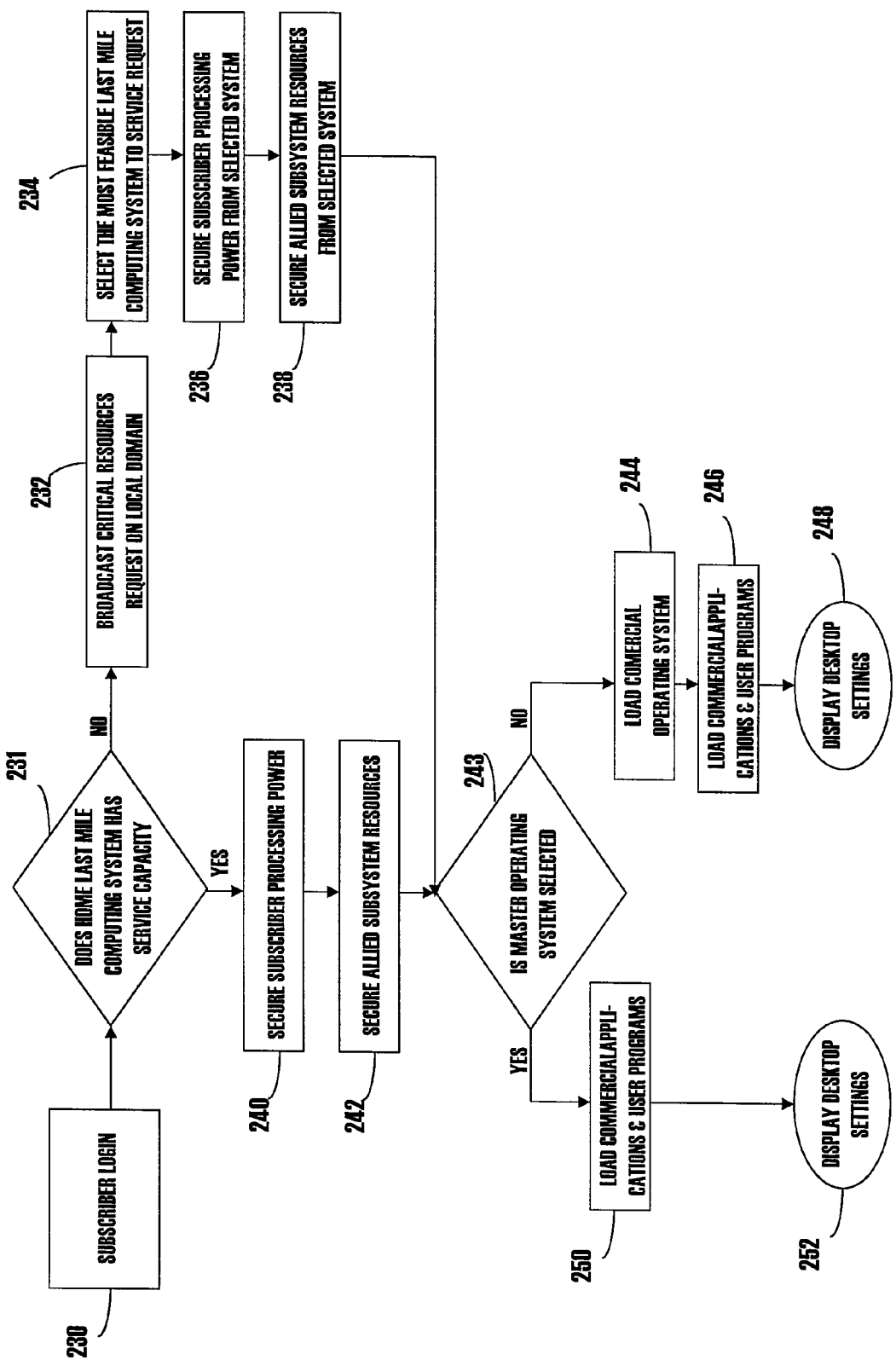
FIG. 4 illustrates an example method for handling over subscription in a local last mile computing domain.

FIG. 4 illustrates an example method for handling over subscription in a local last mile computing domain. The logic at block 230 embodies a subscriber logging into a home last mile computing system location to request service. The decision diamond of state 231 determines whether the last mile computing system has enough processing capacity and other critical resources at said location, so as to serve the present subscriber's request for service with optimum performance levels. The kernel subscription process determines this by querying the resource request scheduler to establish whether processing and other key resources exist to service the subscriber. If key resources such as processing capacity and memory can be procured at home location to service the subscriber with optimum performance levels, the decision of the diamond at state 231 is determined to be positive. If either the processing capacity or other critical resources cannot be secured at the home location, then the decision of the diamond at state 231 is determined to be negative.

In case of negative decision at state 231, the logic moves to block 232 wherein the home location broadcasts a critical resources required request on the local domain of which the last mile computing system is a member. The architecture of the local domain last mile computing systems is designed such that all last mile computing systems within a local domain are capable of servicing the oversubscribed subscriber of any peer last mile computing system. The logic then moves to block 234 where all members of the local last mile computing domain responds with their available service capacity and the home location last mile computing system selects the one that is most suitable to service the present oversubscribed subscriber. This selection is usually a function of which of the peer last mile computing systems has the most available capacity. However, the home location last mile computing system can also modify the selection criteria for choosing the best suited peer to service the over subscribed subscriber. Once the best peer is identified to service the oversubscribed subscriber, the logic then moves to block 236.

At block 236, the logic is for the home location last mile computing system to secure the processing capacity meeting the subscriber's subscription criteria. Once the processing resources are secured, the logic then moves to block 238 where the logic is to acquire the allied subsystem resources in the selected last mile computing system. In this case, where the processing and other allied subsystem resources are acquired on a peer last mile computing system in a local domain, the peer resources dedicated to the oversubscribed subscriber becomes a virtual extension of the system requesting such resources. This is possible due to the fact that the peer last mile computing systems in a local domain are connected over a high capacity, resilient and self healing optically enabled communication network. In most cases, if there exists processing capacity at a last mile computing location to service a newly service requesting subscriber, then there are also exists other critical resources to service the service requesting subscriber. However, the last mile computing systems in a local domain can be designed to mix and match resources from other last mile computing systems within that domain.

If the decision diamond of state 231 is determined to be positive, then the logic moves to block 240 and then to block 242 wherein processing and allied subsystem resources are secured at the home location. The logic then moves to the diamond decision 243, which determines if the master operating system is selected as the preferred operating system to perform last mile computing. Checking the registry of the present subscriber's unique child kernel process, it is determined whether or not the subscriber has chosen to perform last mile computing session using the native master operating system. If the diamond decision of state 243 is negative, then the logic moves to block 244 where the subscriber's chosen operating system is loaded to run on top of the master operating system. The logic then moves to block 246 where subscriber specific commercial applications and user programs are loaded in the subscriber allocated memory of the memory space of the allied resources subsystem. Thereafter the logic moves to the circular block 248 wherein the desktop settings based on the selected commercial operating system environment are displayed on the subscriber's display and the subscriber can begin performing last mile computing.

If the diamond decision of state 243 is positive, the master operating system 10 prepares to provide the entire operating system functionality to the present subscriber. The logic then moves to block 250 where commercial applications and subscriber selected user programs are loaded and configured in the subscriber allocated memory and processing resources. The logic then moves to the circular block 252 wherein the desktop settings based on the master operating system environment are displayed on the subscriber's display and the subscriber can begin performing last mile computing in the master operating system environment.

Figure 5:
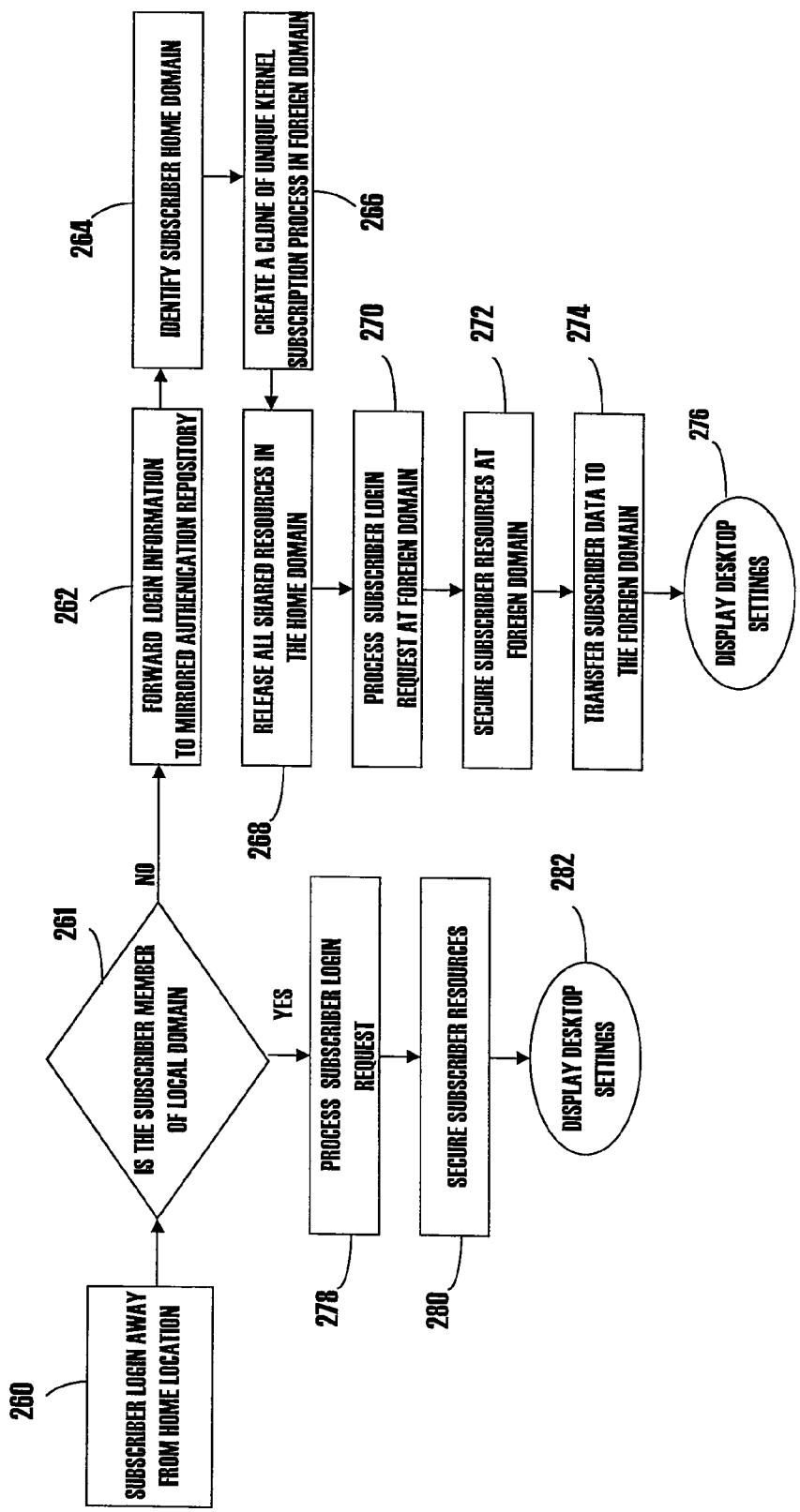
FIG. 5 illustrates example logic for last mile computing in a foreign domain.

FIG. 5 illustrates example logic for last mile computing in a foreign domain. Because of the ubiquitous and transparent nature of last mile computing, subscribers can potentially login from any foreign location when away from home location and be able to perform last mile computing. The logic at block 260 embodies a subscriber requesting service by logging into a last mile computing system away from home location. Since subscriber's can also request service from any last mile computing system on the local domain of which their home last mile computing system is a member, the decision diamond of state 261 signifies a test to determines whether the subscriber is a member of the local domain. If the subscriber is a member of the local domain, which implies that the subscriber's home last mile computing system is a member of the present local domain, then the decision diamond at state 261 turns positive and the logic moves to block 278. At block 278 the subscriber is transparently handed over to its home last mile computing system and the subscriber is authenticated. The logic then moves to block 280 where subscriber's last mile computing session resources are secured and the logic advances to the circular block 282 where the home last mile computing system displays the desktop settings and the subscriber can begin performing last mile computing.

If the diamond decision at state 261 turns negative, it is established that the service requesting subscriber is a member of a foreign domain and the logic moves to block 262. At block 262, the subscriber's login information is forwarded to the closest mirrored authentication repository. This mirrored authentication repository can be on the present local last mile computing domain or can be on any one of the adjacent last mile computing domains. At block 262, when the authentication information is sent to the closest mirrored authentication repository, the subscriber is authenticated and the logic moves to block 264. At block 264, the logic is to identify the subscriber's home domain location. This information about the subscriber's home location is also stored in the mirrored authentication repository. Once the subscriber's home location is identified, the logic moves to block 266 wherein the original subscriber kernel subscription process is notified of the subscriber's intent to perform last mile computing in a foreign last mile computing location. The original child kernel subscription process provides the subscriber's subscription details and requests the master operating system of the foreign last mile computing system to create a clone of itself in the foreign last mile computing location, and the logic then moves to block 268 wherein the original child kernel subscription process releases all shared resources. This entails temporarily removing the subscriber earmarked resource requirement from the home last mile computing system. For example, if the home last mile computing system has 100 subscribers subscribed, now when one of the subscriber is performing computing at a foreign domain; the home computing system will consider it has only 99 subscribed subscribers. Thereafter the original child kernel subscription process after being acknowledged that its clone has been created at the foreign location goes into the dormant mode. The logic then moves to block 270, where the subscriber is re-authenticated at foreign domain. This can happen transparently or the foreign last mile computing system can prompt the subscriber to enter login credentials once more. At block 272, the clone subscription process secures all the necessary last mile computing resources based on the present subscriber's subscription criteria. The logic then moves block 274 wherein subscriber data is transferred to the foreign last mile computing location. The subscriber data at block 274 can be transferred from the home location to the foreign location in one of two ways. The mostly used subscriber data may be transferred or the entire data may be transferred from the home location to the foreign location. If the present subscriber has performed last mile computing at the present foreign location multiple times, then the entire subscriber data may be transferred. This data is transferred to a secure storage location at the storage space 62 of the foreign domain's allied resources subsystem. Regardless of whether partial data is transferred or the entire data is transferred to the foreign location, this data transfer remains temporary. The subscriber's permanent storage space at the home location remains exclusive to the subscriber and the data content remains unchanged. When data is transferred to the foreign location, it implies a copy of the original data. During the last mile computing session at the foreign location, as the data content changes, it gets synchronized with the original data at the subscriber's home location. Once either partial or the entire data is transferred to the foreign location, the logic moves to circular block 276 wherein the foreign last mile computing system based on the subscriber's preferred operating system environment displays desktop settings and the subscriber can begin performing last mile computing at said foreign location.

Figure 6:
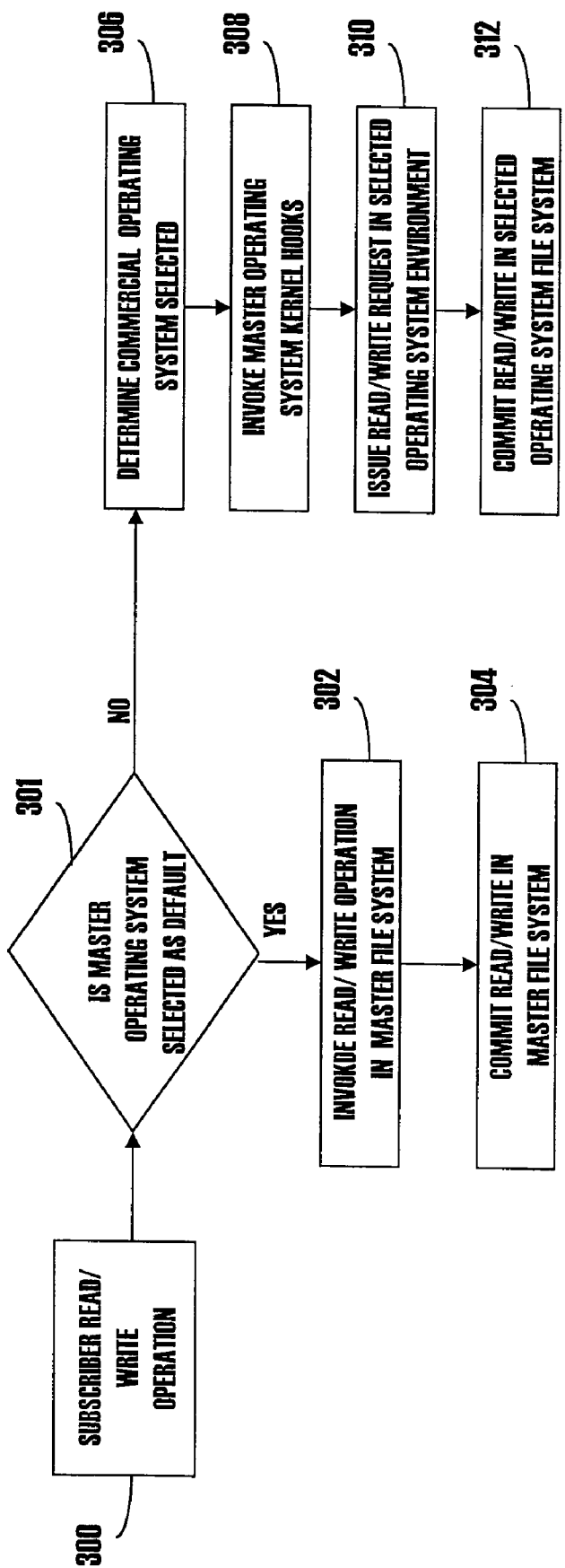
FIG. 6 illustrates example logic for read write operations in a master operating system environment and in a commercial operating system environment.

FIG. 6 illustrates example logic for read write operations in a master operating system environment and in a commercial operating system environment. The logic illustrated in FIG. 6 can be used when such a commercial operating system is selected as the preferred operating system. The logic at block 300 embodies a subscriber read write operation. The decision diamond at state 301 determines whether or not the master operating system is selected as the default operation system. If the state turns positive, then the logic moves to block 302 where the read write operation of the master operating system is invoked and then logic moves to block 304 wherein the read write is committed in the master operating system environment. Should the diamond decision at state 301 turn negative the logic moves to block 306 wherein the preferred commercial operating system of the present subscriber is determined. The logic then moves to block 308 wherein the master operating system invokes the kernel hooks of the appropriate type from the kernel hooks subsystem to access the file system functionality in the subscribers preferred commercial operating system environment. The kernel hooks can of the type Microsoft environment 31, Apple-Macintosh environment 32, Unix and Linux Environment 33, or Legacy Systems environment 34. The logic then moves to block 310 wherein the kernel hooks of the master operating system simulates a read write request in the selected operating system environment and issues such read write request to the selected operating system. The logic then moves to block 312 wherein the read write is committed in the subscriber selected commercial operating system environment.

Figure 7:
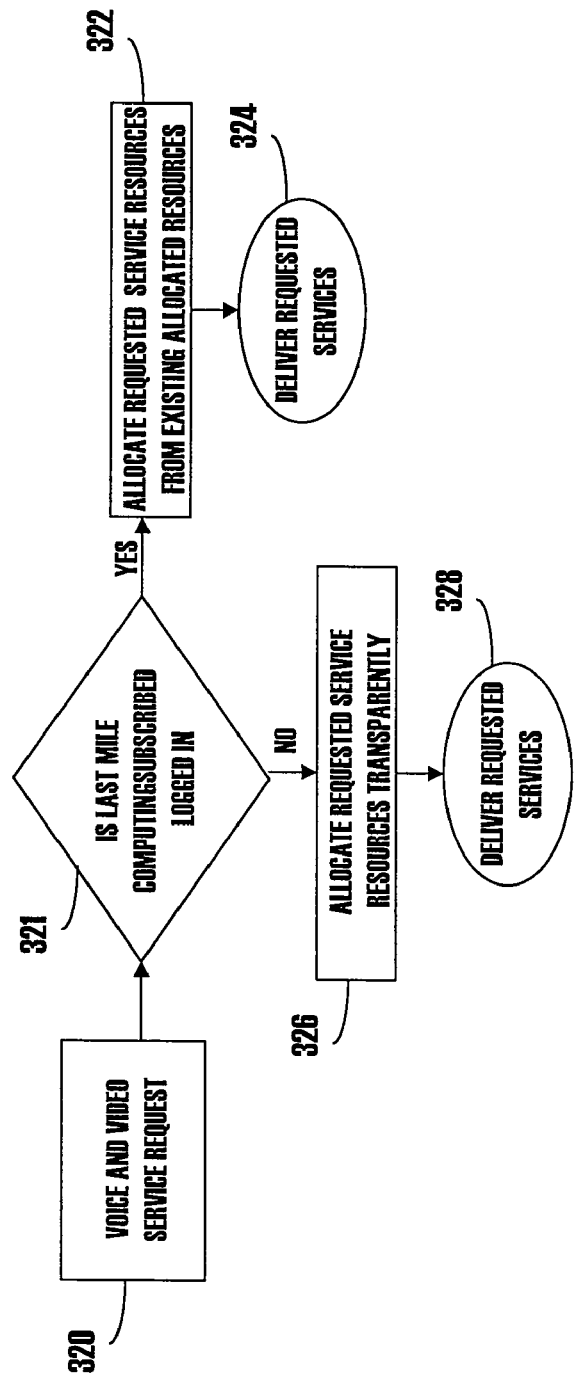
FIG. 7 illustrates an example method for transparent delivery of voice and video services.

FIG. 7 illustrates an example method for transparent delivery of voice and video services. During the initial subscription process whereby a last mile computing services provider offers voice and video services, subscribers can choose to subscribe to said services in addition to computing or data service. For the purpose of explanation of the logic, voice and video services are considered to be requested simultaneously however subscribers request said services individually. The logic at block 320 embodies subscribers requesting voice and video services and the logic moves to state 321, which has been illustrated as a decision diamond for clarity of disclosure. The logic at state 321 is a test to determine whether the subscriber at the present client premise device location is logged in to the system. If the decision at state 321 is positive implying the subscriber at said client premise device location is performing last mile computing, the logic moves to block 322. At block 322, the last mile computing system allocates system resources for the requested services from the existing resources that have been allocated to the subscriber's last mile computing session. Subsequently the logic moves to the circular block 324 whereby the requested services are delivered to the subscriber.

If the diamond at 321 turns negative implying that the subscriber at said client premise device is not performing last mile computing. The logic then moves to block 326 whereby the last mile computing system without challenging subscriber to provide authentication credentials assigns system resources transparently to process subscriber voice and video services request. Subsequently the logic moves to the circular block 328 whereby the requested services are delivered to the subscriber.

Figure 8:
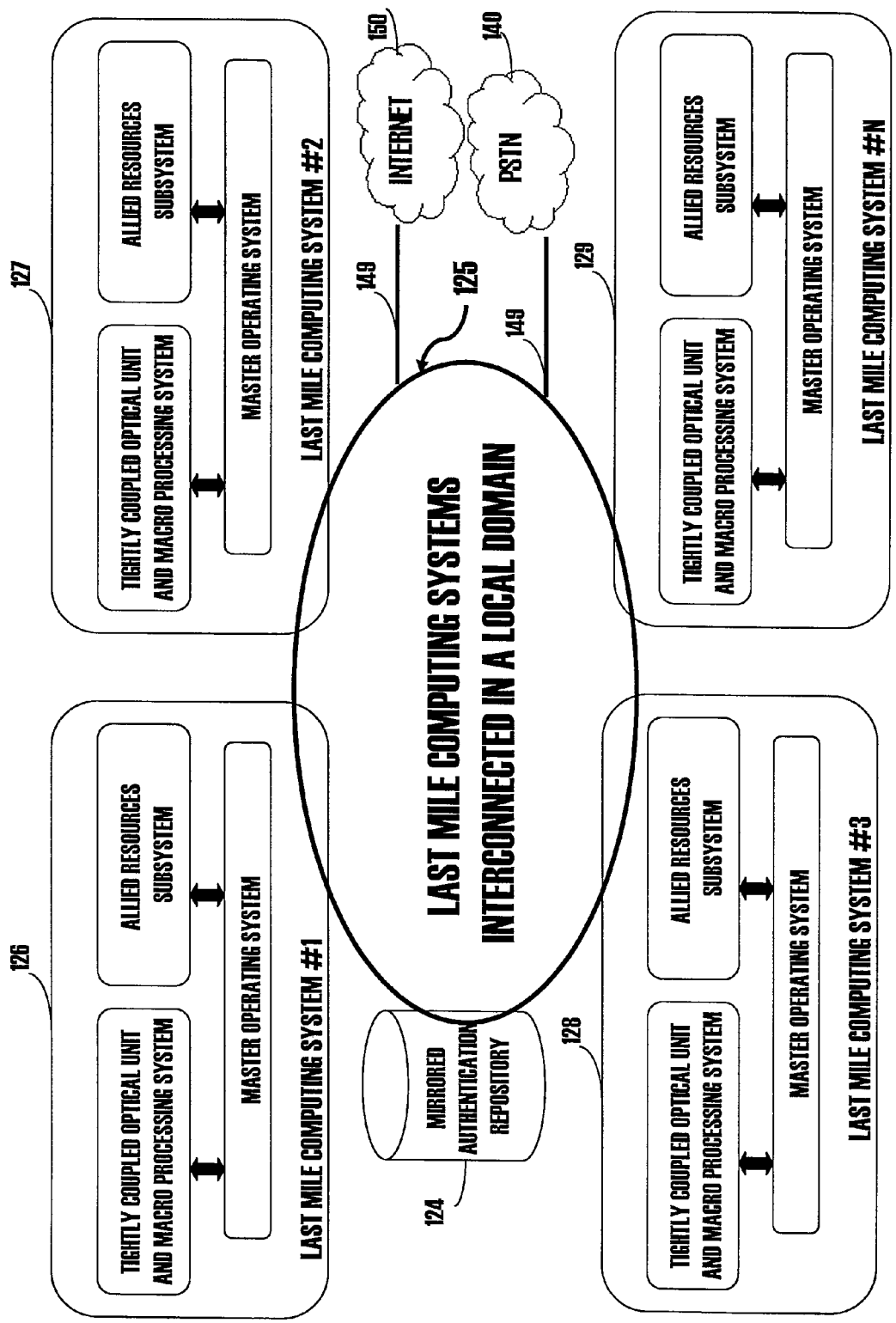
FIG. 8 illustrates an example local domain last mile computing system.

FIG. 8 illustrates an example local domain last mile computing system. A local last mile computing domain 125 interconnects last mile computing systems 126, 127, 128, and 129 present in the local domain 125. The interconnection of the last mile computing systems on the local domain 125 is over a robust optically enabled communication network. FIG. 8 also illustrates the presence of a mirrored authentication repository 124 on the local last mile computing domain. Not all local last mile computing domains may have the mirrored authentication repository. The local last mile computing domain 125 is also connected to the public switched telephone network (PSTN) 140 and the Internet 150. The PSTN and the Internet are connected to the optical communication network of the last mile computing domain by a high speed connection 149. The link capacities of this high speed connection 149 could be different for the Internet and the PSTN. The number of last mile computing systems on the local domain 125 could be 1 or more than one. Number of last mile computing systems in a local last mile computing domain is determined based on a predefined criteria.

Figure 9:
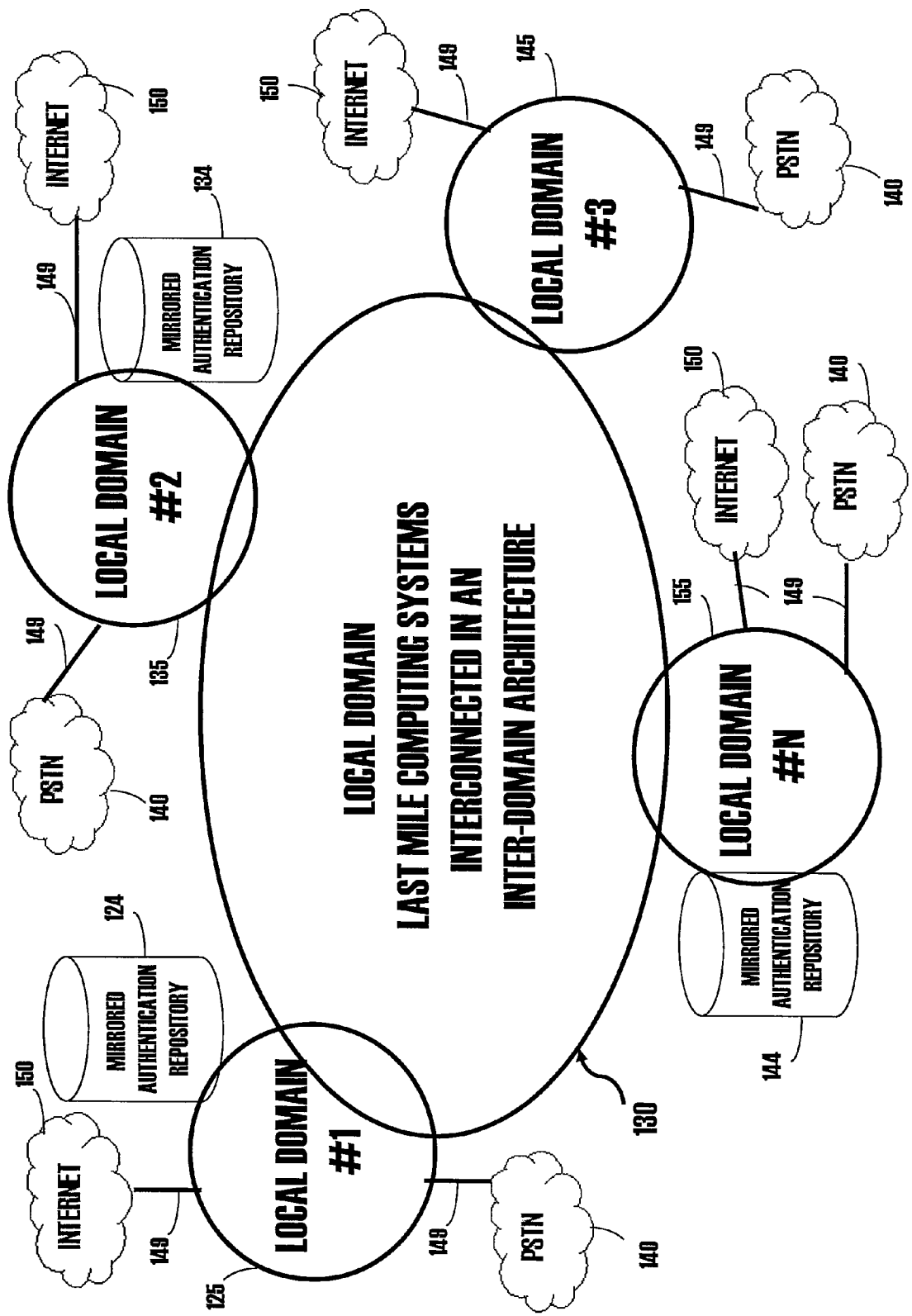
FIG. 9 illustrates example local domain last mile computing systems interconnected in an example inter domain last mile computing system architecture.

FIG. 9 illustrates example local domain last mile computing systems interconnected in an example inter domain last mile computing system architecture. Various local domain last mile computing domains 125, 135, 145 and 155 are interconnected by a robust optically enabled communication network 130 in an inter-domain architecture. The number of local domains on the optically enabled communication network 130 can vary. The optical communications network can be a member of a hierarchical optical communication networks. FIG. 9 also embodies the presence of mirrored authentication repositories 124, 134, and 144 on the network. These mirrored authentication repositories may or may not present on all the local last mile computing domains. When a local last mile computing domain such as 145 needs to authenticate users who are not home subscribers, it avails the services of the closest adjacent mirrored authentication repository. The optically enabled communication network 130 can cover a metro region or can be nationwide or even global in reach. Connection to the PSTN 140 and the Internet 150 is on a regional basis. The connectivity 149 to the PSTN 140 and the Internet 150 can be of varying speeds. Subscribers of the local last mile computing domain 125 are considered foreign subscribers on any of the remaining local last mile computing domains. A home subscriber of any local last mile computing domain can request last mile services which includes data or computing service, voice services and video services from any foreign domain connected to the optically enabled communication network 130. This inter-domain architecture also provides a means for subscribers to change home locations seamlessly.

While particular embodiments are described and illustrated, the particular embodiments described and illustrated are only representative of the subject matter contemplated. The scope of the present invention encompasses embodiments that are or could become apparent to those skilled in the art, and the scope of the present invention is to be limited only by the appended claims. In the claims, reference to an element in the singular is not intended to mean one and only one, but rather one or more unless explicitly stated. The present invention encompasses all structural and functional equivalents to the elements of the embodiments described and illustrated that are known or later come to be known to those of ordinary skill in the art. Moreover, it is not necessary for a device, method, or logic to address each and every problem sought to be solved by the present invention to be encompassed by the present claims. No element, component, or method step in the described and illustrated embodiments is intended to be dedicated to the public regardless of whether the element, component, or method step is explicitly recited in the claims. No claim element herein is to be construed under the provisions of 35 U.S.C. sections 112, sixth paragraph, unless the element is expressly recited using the phrase "means for."

What is claimed is:

1. A system comprising:
   a processing platform having at least one processor operable to provide processing at a plurality of levels to a plurality of endpoints via one or more networks;
   an optical transceiver configured to communicatively couple to the processing platform and operable to:

receive from the processing platform multimedia content processed at the processing platform, the multimedia content operable to deliver a plurality of services to the endpoints;
convert the multimedia content to light signals for communication to the endpoints via the one or more networks; and
communicate the converted multimedia content to the endpoints via the one or more networks for display to subscribers at the endpoints;
a multi-user, multi-tasking operating system (OS) residing at the processing platform, the multi-user, multi-tasking OS being operable to generate an instance of one of a plurality of OS environments for each endpoint, generation of the instance of the OS environment being a response to a selection of the OS environment by a subscriber at the endpoint, the OS environment enabling processing for the endpoint at the processing platform according to one or more preferences of the subscriber; and
an allied resources subsystem residing at the processing platform, the allied resources subsystem being operable to provide the subscribers a plurality of system resources available at the processing platform, the system resources comprising at least delivery of the services to the endpoints.

2. The system of claim 1, wherein the multimedia content comprises one or more of audio, data, video, or voice.

3. The system of claim 1, wherein the optical transceiver is further operable to multiplex a plurality of light signals of different wavelengths, each light signal being operable to support a plurality of services.

4. The system of claim 1, wherein the allied resource subsystem comprises a plurality of commercial software applications for a plurality of users.

5. The system of claim 4, wherein the allied resource subsystem comprises an architecture that is readily expandable with respect to capacity.

6. The system of claim 1, wherein the multi-user, multi-tasking OS operates in a unified state serving clients operating in autonomous modes.

7. The system of claim 1, wherein the multi-user, multi-tasking OS resides in a protected memory space of the allied resources subsystem at the processing platform.

8. The system of claim 1, wherein the allied resources subsystem is operable to assign particular system resources to a particular endpoint and reassign at least some of the particular system resources to one or more tasks based on activity at the endpoint.

9. The system of claim 1, wherein the plurality of OS environments comprise one or more closed-source OSs and one or more open-source OSs.

10. The system of claim 1, wherein the multi-user, multi-tasking OS operates in a distributed or monolithic state.

11. A method comprising:
at a processing platform having at least one processor, providing processing at a plurality of levels to a plurality of endpoints via one or more networks;
at an optical transceiver configured to communicatively couple to the processing platform:
receiving from the processing platform multimedia content processed at the processing platform, the multimedia content operable to deliver a plurality of services to the endpoints;
converting the multimedia content to light signals for communication to the endpoints via the one or more networks; and
communicating the converted multimedia content to the endpoints via the one or more networks for display to subscribers at the endpoints;
using a multi-user, multi-tasking operating system (OS) residing at the processing platform, generating an instance of one of a plurality of OS environments for each endpoint, generation of the instance of the OS environment being a response to a selection of the OS environment by a subscriber at the endpoint, the OS environment enabling processing for the endpoint at the processing platform according to one or more preferences of the subscriber; and
at an allied resources subsystem residing at the processing platform, providing the subscribers a plurality of system resources available at the processing platform, the system resources comprising at least delivery of the services to the endpoints.

12. The method of claim 11, wherein the multimedia content comprises one or more of audio, data, video, or voice.

13. The method of claim 11, wherein the optical transceiver is further operable to multiplex a plurality of light signals of different wavelengths, each light signal being operable to support a plurality of services.

14. The method of claim 11, wherein the allied resource subsystem comprises a plurality of commercial software applications for a plurality of users.

15. The method of claim 14, wherein the allied resource subsystem comprises an architecture that is readily expandable with respect to capacity.

16. The method of claim 11, wherein the multi-user, multi-tasking OS operates in a unified state serving clients operating in autonomous modes.

17. The method of claim 11, wherein the multi-user, multi-tasking OS resides in a protected memory space of the allied resources subsystem at the processing platform.

18. The method of claim 11, wherein the allied resources subsystem is operable to assign particular system resources to a particular endpoint and reassign at least some of the particular system resources to one or more tasks based on activity at the endpoint.

19. The method of claim 11, wherein the plurality of OS environments comprise one or more closed-source OSs and one or more open-source OSs.

20. An apparatus comprising:
a processing platform having at least one processor operable to provide processing at a plurality of levels to a plurality of endpoints via one or more networks;
a multi-user, multi-tasking operating system (OS) residing at the processing platform, the multi-user, multi-tasking OS being operable to generate an instance of one of a plurality of OS environments for each endpoint, generation of the instance of the OS environment being a response to a selection of the OS environment by a subscriber at the endpoint, the OS environment enabling processing for the endpoint at the processing platform according to one or more preferences of the subscriber;
an allied resources subsystem residing at the processing platform, the allied resources subsystem being operable to provide the subscribers a plurality of system resources available at the processing platform, the system resources comprising at least delivery of a plurality of services to the endpoints, the plurality of services comprising at least display of multimedia content at the endpoints; and
a communication interface to communicatively couple the processing platform to an optical transceiver configured to:

receive from the processing platform multimedia content processed at the processing platform, the multimedia content operable to deliver the plurality of services to the endpoints;

convert the multimedia content to light signals for communication to the endpoints via the one or more networks; and communicate the converted multimedia content to the endpoints via the one or more networks for display to subscribers at the endpoints.

21. The apparatus of claim 20, wherein the optical transceiver is further operable to multiplex a plurality of light signals of different wavelengths, each light signal being operable to support a plurality of services.

22. The apparatus of claim 20, wherein the multimedia content comprises one or more of audio, data, video, or voice.

23. The apparatus of claim 20, wherein the allied resource subsystem comprises a plurality of commercial software applications for a plurality of users.

24. The apparatus of claim 20, wherein the allied resource subsystem comprises an architecture that is readily expandable with respect to capacity.

25. The apparatus of claim 20, wherein the multi-user, multi-tasking OS operates in a unified state serving clients operating in autonomous modes.

26. The apparatus of claim 20, wherein the multi-user, multi-tasking OS resides in a protected memory space of the allied resources subsystem at the processing platform.

27. The apparatus of claim 20, wherein the allied resources subsystem is operable to assign particular system resources to a particular endpoint and reassign at least some of the particular system resources to one or more tasks based on activity at the endpoint.

28. The apparatus of claim 20, wherein the plurality of OS environments comprise one or more closed-source OSs and one or more open-source OSs.

29. The apparatus of claim 20, wherein the multi-user, multi-tasking OS operates in a distributed or monolithic state.

* * * * *